United States Patent [19]
Vargas

[11] Patent Number: 5,661,959
[45] Date of Patent: Sep. 2, 1997

[54] REAR ROLLER SCRAPER FOR GOLF COURSE MOWER

[75] Inventor: Daniel R. Vargas, Niles, Ill.

[73] Assignee: The Vargas Corporation, Niles, Ill.

[21] Appl. No.: 592,134

[22] Filed: Nov. 8, 1995

[51] Int. Cl.$^6$ .................... A01D 34/62; E01C 19/28
[52] U.S. Cl. .................... 56/7; 56/249; 56/DIG. 20; 404/129
[58] Field of Search ..................... 56/7, 249, 294, 56/253, DIG. 20; 404/129, 128

[56] References Cited

U.S. PATENT DOCUMENTS

| | | | |
|---|---|---|---|
| 3,675,546 | 7/1972 | Smith | 404/129 |
| 4,021,996 | 5/1977 | Bartlett et al. | 56/249 X |
| 4,378,052 | 3/1983 | Anderson | 404/129 X |
| 4,947,630 | 8/1990 | Rich et al. | 56/249 |
| 5,222,828 | 6/1993 | Magalski | 404/129 X |
| 5,274,989 | 1/1994 | Ng | 56/400.02 X |

*Primary Examiner*—Terry Lee Melius
*Attorney, Agent, or Firm*—Hill, Steadman & Simpson

[57] ABSTRACT

The improvement of the present invention comprises an elongated scraper which has a scraper surface that is disposed along substantially the entire length of the most rearwardly disposed roller supporting the mower structure. Such elongated scraper is disposed for stripping accumulated grass and debris from the most rearwardly disposed roller surface as such rearward roller rotates rearwardly during a mowing operation. In preferred embodiments, the elongated scraper is supported by respective pivot arms which are pivotedly carried upon the scraper support frame and are urged downwardly by means of a coil spring, in order to dispose the scraper surface into a stripping proximity vis-a-vis the rear surface of the rearwardly disposed roller, to remove accumulated grass debris therefrom, and thereby control the depth of cut of the grass comprising the green surface.

6 Claims, 3 Drawing Sheets

REAR ROLLER SCRAPER FOR GOLF COURSE MOWER

BACKGROUND OF THE INVENTION

The present invention relates to golf course maintenance equipment, and more particularly to improvements in lawnmowers for trimming the greens on a golf course, and yet more particularly to a scraper apparatus for assuring that the height of cut of the grass on a green is maintained in uniformity.

In the prior art, a variety of different lawnmower structures have been proposed and utilized with some success in the trimming of the greens on a golf course. As is known in the art, a "green" on a golf course is that area surrounding each golf hole or "cup". Typically, greens are of different sizes, shapes, and topographies to provide variety. But all should have a substantially uniform surface having first minimal surface irregularities.

As those skilled in the art are aware, it is upon the golf green where the golfing activity for each hole is terminated by one or more "putts", or "putting strokes", which putting strokes continue alternatingly between players, until each ball is tapped into the hole. Accordingly, the area around the hole known as the "green" must be of a substantially uniform surface in order to permit reliance upon skill by the players, rather than upon happenstance in the putting strokes. Thus, it is of critical importance that the height of the grass on the green be of substantially uniform height. And hence, it becomes significantly important that the lawnmower for trimming the greens of the golf course assure that the grass is trimmed to a uniform height.

In view thereof, most prior art lawnmowers for trimming greens in a golf course have had some mechanism for adjusting the height of the blades, usually comprising blades on a reel-type lawnmower. In order to utilize such depth adjustment mechanisms effectively, it has been necessary to support such prior art lawnmowers for trimming the greens on a golf course typically upon a plurality of rollers. Unfortunately, these rollers, and particularly the rearward most disposed rollers have a tendency to accumulate clipped grass, and other debris thereon, which interferes with and substantially negates the functioning of the depth of cut adjustment. The undesirable result is a green which has differing heights of grass at different points on the green. This situation of a non-uniform, or irregular, green surface detracts from the element of skill in the game of golf, and thus is regarded as substantially undesirable in the golf course maintenance arts.

Accordingly, in view of the defects and deficiencies of prior art golf course maintenance equipment and related techniques, it is a material object of the present invention to provide a green trimming lawnmower structure which will allow for uniform height of the grass on a green.

It is a yet further object of the improved golf course green mower structure of the present invention to provide a mechanism for removing debris from the support rollers for the mower in order to assure substantial uniformity of depth of cut by the lawnmower blades into the grass comprising the golf green.

These and other objects and advantages of the present invention will become apparent to those skilled in the art upon review of the following summary of the invention, brief description of the drawing, detailed description of preferred embodiments, appended claims and accompanying drawings.

SUMMARY OF THE INVENTION

The present invention constitutes an improvement in golf course maintenance equipment and particularly improvements in lawnmowers for trimming the greens of a golf course. Typically, such a lawnmower is of the reel mower type wherein a plurality of mower blades are radially disposed in a reel-like array. Such reel of blades is supported by means of a support frame having a height adjustment means.

The improvement of the present invention comprises an elongated scraper which has a scraper surface that is disposed along the entire length of the most rearwardly disposed roller supporting the mower structure. Such elongated scraper is disposed for stripping accumulated grass and debris from the most rearwardly disposed roller surface, as such rearward roller rotates rearwardly during a mowing operation.

Such elongated roller surface scraper is supported upon a scraper support frame which is attached to the frame of the lawnmower. The elongated scraper is supported by respective pivot arms, which are pivotedly carried upon the scraper support frame. These pivot arms are urged downwardly by means of a coil spring in order to dispose the scraper surface into a stripping array vis-a-vis the rear surface of the rearwardly disposed roller, and thus function to remove accumulated grass debris therefrom, and thereby to control the depth of cut of the grass comprising the green surface.

BRIEF DESCRIPTION OF THE DRAWING

The golf course green mower improvement structure of the present invention is set forth in the following drawings, and in which.

DETAILED DESCRIPTION OF PREFERRED EMBODIMENTS

Figure 1:
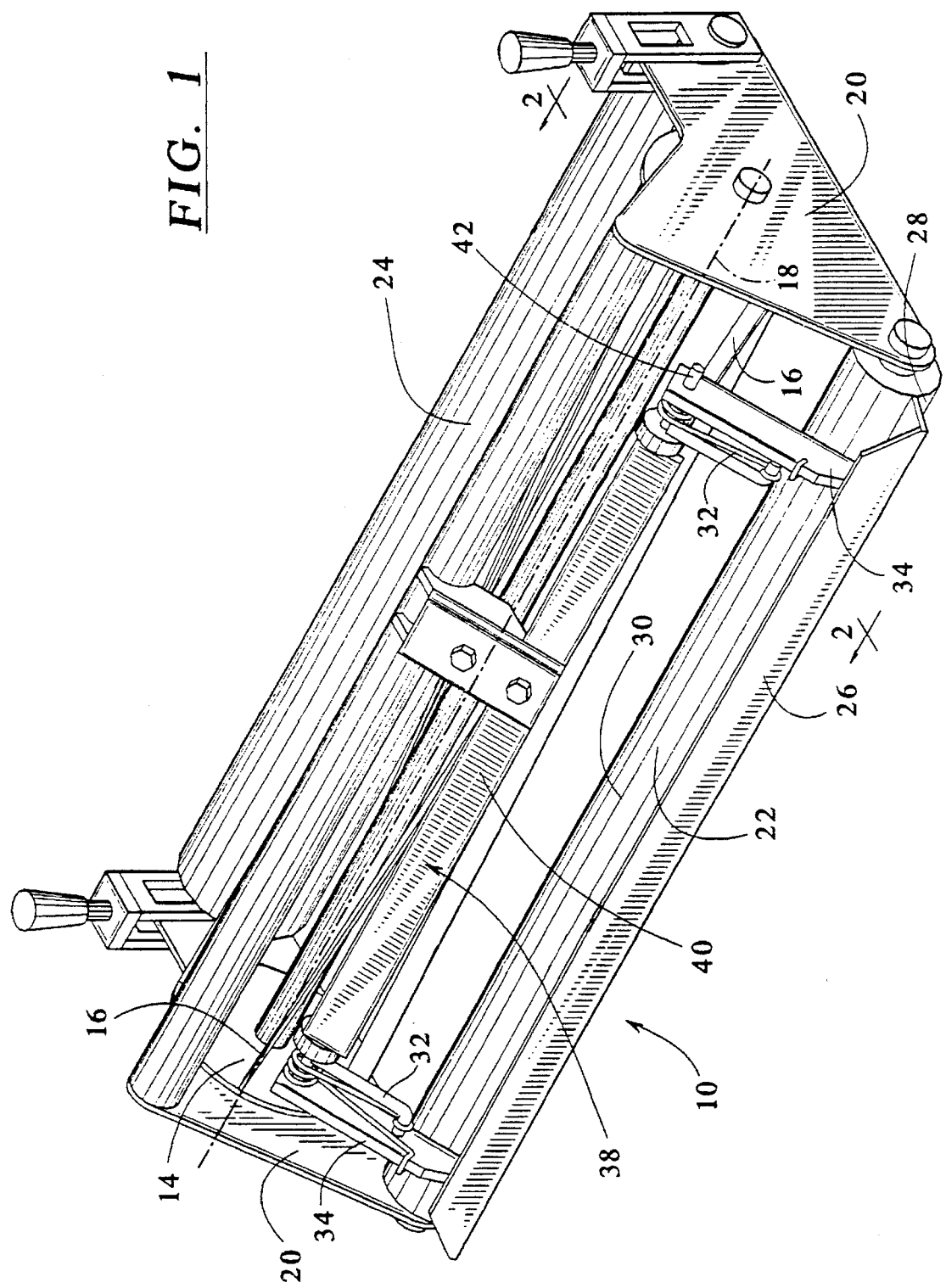
FIG. 1 is a perspective view showing the close disposition of the elongated scraper blade with the rearward roller of the lawnmower, and showing the associated support structure for the elongate scraper.
Figure 2:
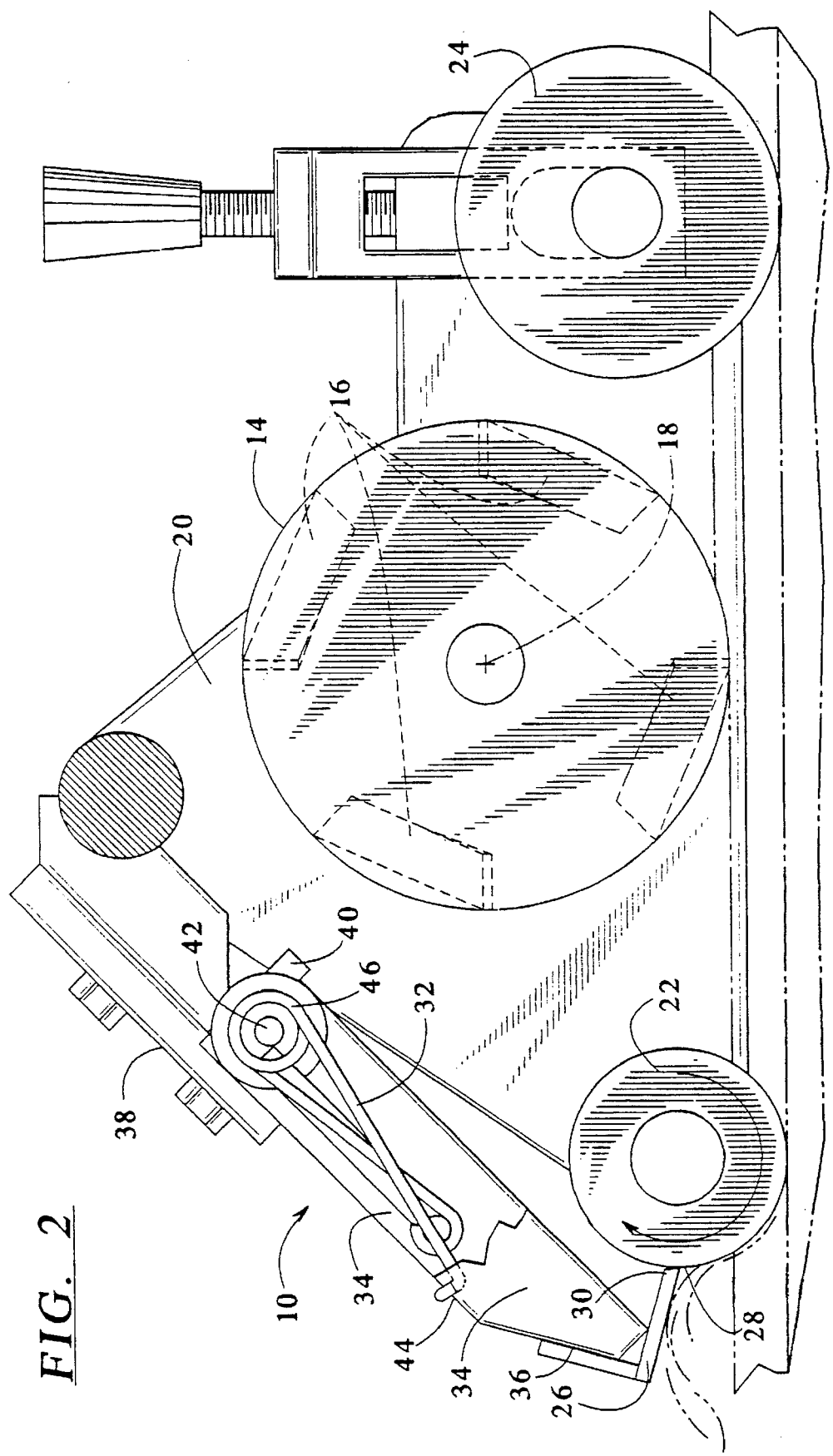
FIG. 2 is an end view taken along lines 2—2 of FIG. 1, and showing in enlarged form the spring mechanism which urges the elongated scraper by means of pivot arms downwardly into stripping format proximally of the surface of the rearward most roller lawnmower.
Figure 3:
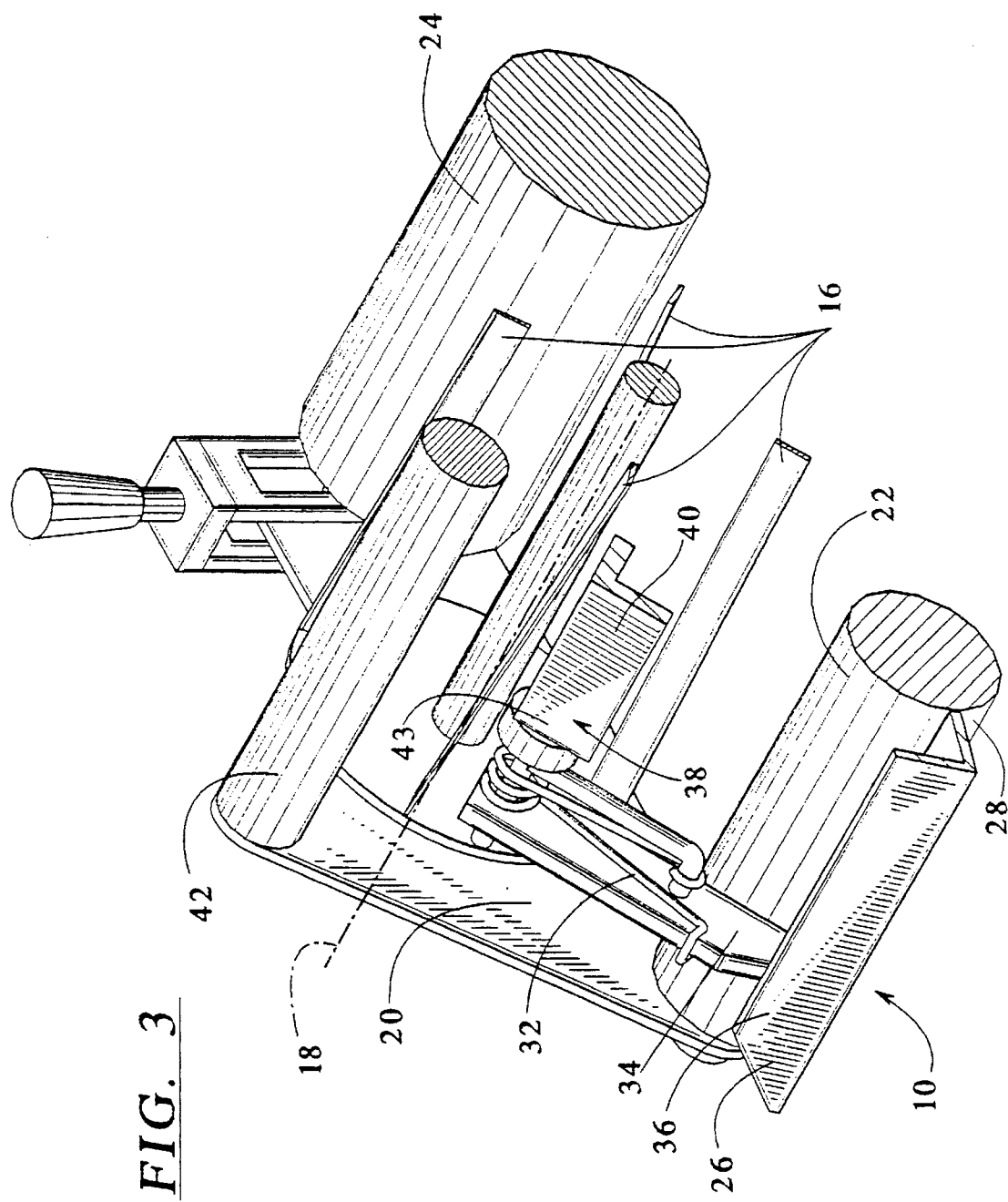
FIG. 3 is a further sectional view of the elongated scraper blade structure of the present invention illustrating inventive features thereof.

Referring now to the FIGS. and as shown in FIG. 1 in particular, the present invention is directed to improvements comprising roller scraper apparatus generally 10 in a lawnmower not shown for trimming the greens of a golf course to a uniform height. Such lawnmowers have a horizontally disposed mower reel 14 which comprises a plurality of horizontally disposed mower blades 16 positioned radially about the mower reel axle 18. The mower reel 14 is supported by a mower frame 20. Mower frame 20 is supported by at least rearward and forward rollers 22,24 for contact with the green surface to be trimmed. A height adjustment mechanism is provided for controlling the depth of cut of mower blades 16 and thereby the height of the remaining grass of the green surface.

The improvement of the present roller scraper comprises an elongated scraper 26 for scraping the rearward roller surface 28 which is disposed along substantially the entire length of the rearward roller 22. Such elongated scraper 26 functions to strip accumulated grass and debris from rearward roller surface 28, as the rearward roller 22 rotates rearwardly during a mowing operation.

This golf course green mower improvement comprising roller scraper, apparatus 10 may further include means whereby scraper surface 30 of elongated scraper 26 is disposed behind rearward roller surface 28 and raised above the level of the green surface to be mowed as shown in the Figs. In these and other preferred embodiments of the present invention, the elongated scraper 26 comprises a length of essentially flat sheet metal, and preferably sheet steel, which is disposed at a selected space, and at a preferably uniform distance, from the rearward roller surface 28 for stripping accumulated grass and debris therefrom.

Elongated scraper 26 is urged downwardly and into proximity with the rearward roller surface 28 by means of coil spring 32 that is operatively connected thereto. Elongated scraper 26 further includes a pair of pivot arms 34,34 which are attached at respective ends 36,36 thereof to elongated scraper 26. These pivot arms 34,34 are urged downwardly by coil spring 32 to carry elongated scraper 26 downwardly therewith.

These elongated scraper arms 34,34 are carried pivotally upon a fixedly disposed scraper support frame 38. This scraper support frame 38 comprises an elongated member 40 attached to the upper surface of the lawnmower and have pivot rods 42,42 disposed from the longitudinal ends 43,43 thereof for pivotally supporting the respective pivot arms 34,34 of the scraper 10 thereon. Such support frame 38 may be preferably retrofitted utilizing existing bolt structures on the top of the existing lawnmower structure.

Pivot arms 34,34 of elongated scraper 26 and the elongated member 40 of support frame 38 include respective coil spring abutment surfaces 44,44, as are shown in the Figs. Each of the coil springs 32,32 is disposed longitudinally upon its respective pivot rod 42. The coil springs 32 urge between the fixedly disposed support frame 18 and the pivot arms 34,34 of the elongated scraper 26, to urge the pivot arms of the elongated scraper 26 and thereby the elongated scraper per se, downwardly into stripping proximity with the rearward roller 30.

In some prior art lawnmower structures, the length of elongated scraper 26 which may be retrofitted thereon may be approximately 23 inches. The length of the support frame 38 may be approximately 16½ inches. The pivot rods 42 in some embodiments may be a ¼ inch. The sheet metal used may preferably comprise sheet steel, and may be approximately 1 inch in width, and ¼ inch in thickness, although the elongated scraper 26 itself may be made from ⅛ inch steel. The frame 38 for the scraper 26 may preferably comprise in some preferred embodiments 1 inch angle iron. The coil spring 32 used is preferably a 90° deflection spring having extended arms 33,33 to urge from a coiled to an uncoiled position as is known in the prior art.

The basic and novel characteristics of the improved methods and apparatus of the present invention will be readily understood from the foregoing disclosure by those skilled in the art. It will become readily apparent that various changes and modifications may be made in the form, construction and arrangement of the improved apparatus of the present invention, and in the steps of the inventive methods hereof, which various respective inventions are as set forth hereinabove without departing from the spirit and scope of such inventions. Accordingly, the preferred and alternative embodiments of the present invention set forth hereinabove are not intended to limit such spirit and scope in any way.

What is claimed is:

1. In a lawnmower for trimming the greens of a golf course, the lawnmower having a horizontally disposed mower reel comprising a plurality of horizontally disposed mower blades disposed radially about the reel, the mower reel supported by a mower frame, the mower frame being supported by at least a rearward and a forward roller for contact with the green's surface to be trimmed, and height adjustment means for controlling the depth of cut of the mower blades and thereby the height of the remaining grass of the green's surface, the improvement comprising:

an elongated scraper having a scraper surface disposed along substantially the entire length of said rearward roller for stripping accumulated grass and debris from said rearward roller surface as said rearward roller rotates rearwardly during a mowing operation;

said elongated scraper being mounted upon pivot means for urging said elongated scraper downwardly and into proximity with said rearward roller surface;

said pivot means comprising least one coil spring operatively connected to said elongated scraper; and and pivot means including a pair of pivot arms attached at respective ends thereof, said said arms being urged downwardly by paid at least said one coil spring to carry said elongated scraper therewith.

2. The golf course green mower improvement of claim 1 wherein:

said scraper surface of said elongated scraper is disposed behind said rearward roller surface and raised above the level of the green's surface to be mowed.

3. The golf course green mower improvement of claim 1 wherein:

said elongated scraper comprises a length of essentially flat sheet metal disposed at a selected spaced distance from said rearward roller surface for stripping accumulated grass and debris therefrom.

4. The golf course green mower improvement of claim 1 wherein said elongated scraper pivot arms are pivotally carried upon a fixedly disposed scraper support frame.

5. The golf course green mower improvement of claim 1 wherein said scraper support frame comprises an elongated member attached to an upper surface of said lawnmower and having pivot rods disposed from the longitudinal ends thereof for pivotally supporting thereon the respective pivot arms of said scraper.

6. The golf course green mower improvement of claim 1 wherein said pivot arm of said elongated scraper and said elongated member of said support frame includes respective coil spring abutment surfaces, and each said coil spring is disposed longitudinally upon said pivot rod, whereby said coil spring urges between said fixedly disposed support frame and said pivot arms of said elongated scraper to urge said pivot arms of said elongated scraper and thereby said elongated scraper downwardly into stripping proximity with said rearward roller.

* * * * *